United States Patent
Richter

(10) Patent No.: US 7,293,750 B2
(45) Date of Patent: Nov. 13, 2007

(54) SUCTION BASE FOR AN APPARATUS SUPPORT DEVICE

(76) Inventor: Harald Richter, Höhenstrasse 32, 76331 Höhenbrand (DE)

( * ) Notice: Subject to any disclaimer, the term of this patent is extended or adjusted under 35 U.S.C. 154(b) by 0 days.

(21) Appl. No.: 11/351,630

(22) Filed: Feb. 10, 2006

(65) Prior Publication Data

US 2007/0051859 A1    Mar. 8, 2007

(30) Foreign Application Priority Data

Oct. 5, 2005    (DE) ............... 10 2005 047 809

(51) Int. Cl.
 *A45D 42/14*    (2006.01)
(52) U.S. Cl. .................. 248/205.5; 248/205.8; 248/206.2
(58) Field of Classification Search .......... 248/205.5, 248/205.6, 205.7, 205.8, 206.1, 206.2, 363; 428/99
See application file for complete search history.

(56) References Cited

U.S. PATENT DOCUMENTS

| | | | |
|---|---|---|---|
| 2,047,658 A * | 7/1936 | Zaiger ................. | 248/205.8 |
| 2,730,325 A * | 1/1956 | Van Dusen et al. ...... | 248/205.8 |
| 3,863,568 A * | 2/1975 | Frederick ............. | 248/205.8 |
| 4,043,531 A * | 8/1977 | Green ................. | 248/537 |
| 4,133,575 A * | 1/1979 | Mader ................. | 296/95.1 |
| 4,580,751 A * | 4/1986 | Panzer ................ | 248/205.8 |
| 6,143,391 A * | 11/2000 | Barnes et al. ........ | 428/99 |
| 6,478,271 B1 * | 11/2002 | Mulholland ........... | 248/205.8 |
| 6,749,160 B1 * | 6/2004 | Richter .............. | 248/206.2 |
| 6,913,232 B2 * | 7/2005 | Richter .............. | 248/205.8 |
| 7,014,233 B2 * | 3/2006 | Chen ................. | 294/64.1 |
| 7,066,434 B2 * | 6/2006 | Kwok ................. | 248/205.8 |

\* cited by examiner

*Primary Examiner*—Anita M. King
(74) *Attorney, Agent, or Firm*—Klaus J. Bach

(57) ABSTRACT

In a suction base for the support of an apparatus, comprising a housing consisting of a hard plastic material and having an opening surrounded by a housing support edge and a suction membrane of PVC disposed in the housing so as to extend across the housing opening and being movable between a release position and an operating position in which the suction membrane is pulled into the housing and a vacuum is generated between the membrane and a support surface such that the support base is firmly pressed into contact with the support surface via the circumferential edge area of the membrane, a separating element is disposed between the housing and the suction membrane to prevent sticking of the membrane to the housing edge upon exposure of the suction base to heat and the release of plasticizer from the suction membrane.

9 Claims, 1 Drawing Sheet

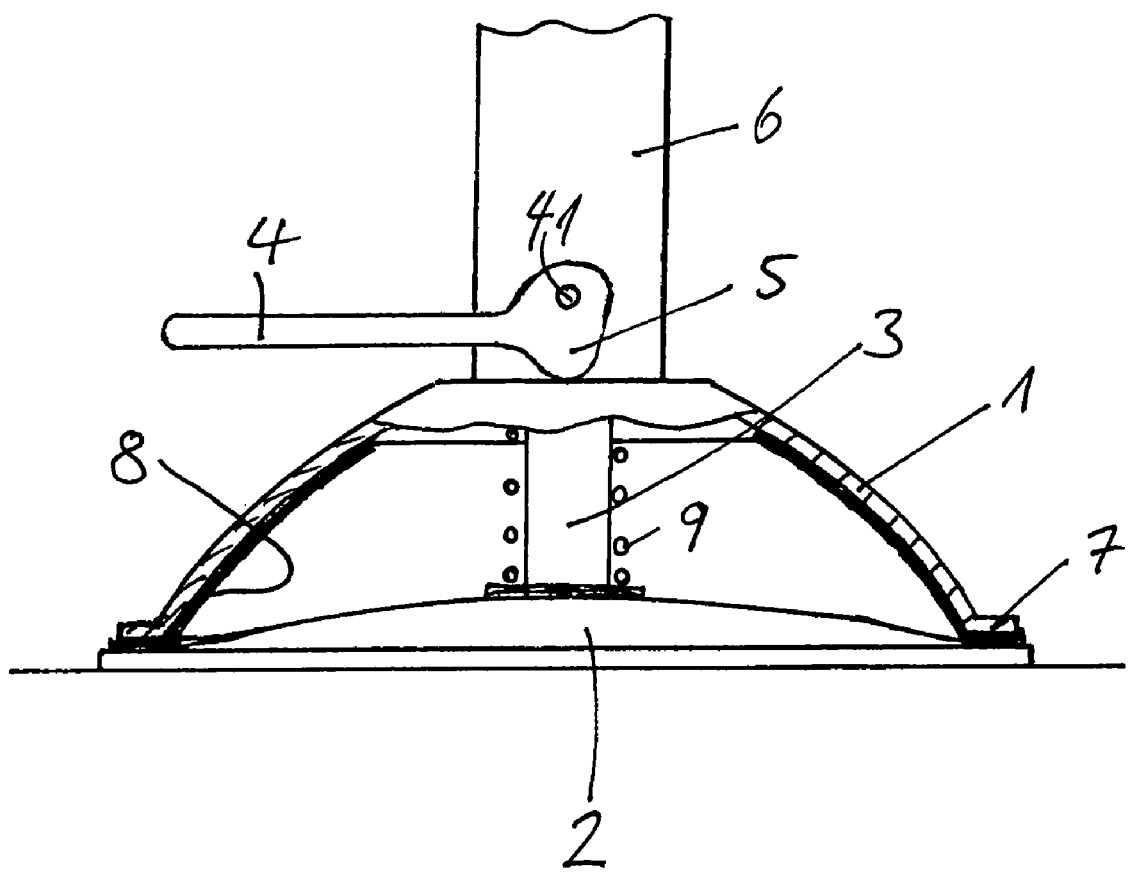

SUCTION BASE FOR AN APPARATUS SUPPORT DEVICE

BACKGROUND OF THE INVENTION

The invention relates to a suction base for an apparatus support device as used for example in motor vehicles for supporting minicomputers (so-called PDA's), mobile navigation apparatus, mobile telephones and similar devices on smooth surfaces such as the windshield of the motor vehicle. The windshields provide a perfectly smooth surface suitable for the attachment of a suction base for supporting a particular apparatus in the field of view of a driver.

The attachment of such a suction base to the windshield however also results in a heavy exposure of the suction base to solar radiation. The suction base generally consists of a housing of rigid plastic material and a suction membrane of a soft plastic which forms the bottom of the suction base. The suction membrane is provided at its center with the shaft of an operating mechanism by which the suction membrane is movable, by means of an operating lever, between a release position and a suction position.

The suction membrane generally consists of PVC, which includes a plasticizer. However, at high temperatures, that is, particularly when exposed to solar radiation, some of the plasticizer is released from the PVC material of the suction membrane. As a result—among other negative effects—the suction membrane adheres to the housing edge, particularly at temperatures above 60°. This detrimentally affects the movability of the suction membrane and the functioning of the suction base and renders the suction base useless over a period of time.

It is the object of the present invention to eliminate this problem.

SUMMARY OF THE INVENTION

In a suction base for the support of an apparatus, comprising a housing consisting of a hard plastic material and having an opening surrounded by a housing support edge and a suction membrane of PVC disposed in the housing so as to extend across the housing opening and being movable between a release position and an operating position in which the suction membrane is pulled into the housing and a vacuum is generated between the membrane and a support surface such that the support base is firmly pressed into contact with the support surface via the circumferential edge area of the membrane, a separating element is disposed between the housing and the suction membrane to prevent sticking of the membrane to the housing edge upon exposure of the suction base to heat and the release of plasticizer from the suction membrane.

In a particular embodiment of the invention, the separating element forms a lining of the interior housing wall of the support base and is in the form of a heat radiation reflecting element in order to mitigate the heating effects of the solar radiation.

Below the invention will be described on the basis of the accompanying drawing.

BRIEF DESCRIPTION OF THE DRAWINGS

The sole FIGURE shows schematically in a cross-sectional view a suction base according to the invention.

DESCRIPTION OF A PREFERRED EMBODIMENT

The suction base is shown schematically in the drawing in its operating position, that is, in the suction position in which the membrane is pulled into the housing 1. The housing 1 consists of a hard plastic material. In the housing 1, a suction membrane 2 of PVC is supported. An operating mechanism for the membrane 2 comprises a shaft 3 which is connected at one end to the center area of the membrane 2 and, with its other end, is pivotally connected, via a joint 41 to an operating lever 4 which is provided with an eccenter cam 5 supported on the housing 1. The housing 1 is provided, or integrally formed, with a connecting element 6 which, in the embodiment shown, is a tubular element 6 for the connection of the suction base to an other component such as a flexible support tube, generally called a goose neck. A spring 9 extends around the shaft 3 between the membrane 2 and the housing 1 for biasing the membrane 2 into its release position. However, the spring 9 may also be disposed within the tubular element 6 and act on the upper end of the shaft 3 within the tubular element 6.

Between the lower edge 7 of the housing 1 and the suction membrane 2, there is a separating element 8 which is fixed to the housing. The separating element 8 covers at least the circumferential edge area 7 of the housing 1, which edge area is supported on the upper side of the suction membrane 2 when a vacuum is generated in the housing in the operating position of the suction membrane 2. However, the separating element 8 may also cover the inner surface of the housing 1 and extend inwardly from the circumferential edge area 7 at least over part of, or over the whole, interior surface of the housing 1, as in the embodiment shown.

The separation element 8 may consist of a heat radiation reflecting metal, particularly aluminum. It may be in the form of a thin metal sheet or a metal foil and may be connected to the housing wall by cementing, mechanically for example by flanging at the circumference or compressing the edge at certain circumferential areas or in any other way. The surface area of the metallic separating element which cooperates with the suction membrane may furthermore be profiled, for example provided with nub impressions or preferably groove impressions comprising radially extending grooves or ribs, whereby the actual contact area between the (heat conducting) metal and the housing wall is reduced. A metallic separation element 8 does not need to be in the form of a separate element, but it may also be formed on the interior wall of the housing by vapor deposition.

Alternatively, the separation element may be in the form of a thin annular disc limited to the area of the housing edge and this annular disc may consist of polyamide, since polyamide does not stick to PVC. Such a polyamide ring can be shoe-like snapped onto the housing edge or it may be pressed onto the housing edge. To provide a whole housing of polyamide however would not be desirable since the polyamide is not attractive in its appearance and furthermore cannot be cemented together with any other plastic material which causes assembly problems.

It is quite apparent that the separating element can be provided in other forms and shapes, for example, in the form of an intermediate textile layer. Other suitable materials could be determined by suitable testing. It is only important that a sticking of the PVC material of the suction membrane to the housing wall by the release of the plasticizer as a result of heat exposure is prevented.

What is claimed is:

1. A suction base for the support of an apparatus comprising a housing (1) of a hard plastic material, said housing having an opening surrounded by a circumferential housing support edge (7), a suction membrane (2) of a plasticizer-containing PVC extending across the housing opening adjacent said support edge (7), an operating mechanism (3, 4) for moving the suction membrane between a release position and an operating position in which a vacuum is generated between the suction membrane (2) and a support surface to which the suction base is to be attached, whereby the housing support edge is pressed onto said suction membrane (2) along the circumferential edge (7) of the housing (1), and a separating element (8) disposed between the suction membrane (2) and the housing (1) at least in the area of said support edge, said separating element (8) consisting of one of a metal sheet and a metal foil, which does not stick to the suction membrane of PVC upon the release of plasticizer therefrom during heat exposure of the suction membrane (2).

2. A suction base according to claim 1, wherein the separating element (8) extends from the support edge (7) inwardly at least over part of the interior wall of the housing (1) and serves as a heat radiation reflector.

3. A suction base according to claim 1, wherein the separating element is attached to the interior housing wall by one of cementing, pressing, clipping and a deformation at the housing edge (7).

4. A suction base according to claim 1, wherein the separating element (8) is formed by vapor deposition on the interior housing wall.

5. A suction base for the support of an apparatus comprising a housing (1) of a hard plastic material, said housing having an opening surrounded by a circumferential housing support edge (7), a suction membrane (2) of a plasticizer-containing PVC extending across the housing opening adjacent said support edge (7), an operating mechanism (3, 4) for moving the suction membrane between a release position and an operating position in which a vacuum is generated between the suction membrane (2) and a support surface to which the suction base is to be attached, whereby the housing support edge is pressed onto said suction membrane (2) along the circumferential edge (7) of the housing (1), and a separating element (8) disposed between the suction membrane (2) and the housing (1) at least in the area of said support edge, said separating element (8) consisting of one of a metal sheet and a metal foil, which does not stick to the suction membrane of PVC upon the release of plasticizer therefrom during heat exposure of the suction membrane (2) the separating element (8) extending from the support edge (7) inwardly at least over part of the interior wall of the housing (1) and having a surface area facing the housing wall which has a profile structure for reducing the contact area between the separating element (8) and the interior wall of the housing (1).

6. A suction base according to claim 5, wherein the separating element consists of polyamide.

7. A suction base according to claim 5, wherein profile structure is in the form of radial grooves or ribs.

8. A suction base according to claim 5, wherein the separating element (8) consists of a fabric.

9. A suction base according to claim 5, wherein the separating element (8) is attached to the interior housing wall by one of cementing, pressing, clipping and by a deformation at the housing edge (7).

* * * * *